United States Patent
Sung et al.

(10) Patent No.: US 8,160,597 B2
(45) Date of Patent: Apr. 17, 2012

(54) APPARATUS AND METHOD FOR ALLOCATING SEGMENTS IN BROADBAND WIRELESS COMMUNICATION SYSTEM

(75) Inventors: Ki-Won Sung, Seoul (KR);
Chae-Young Lee, Daejeon (KR);
Seung-Yong Ham, Seongnam-si (KR);
Ho-Dong Kim, Daejeon (KR);
Sang-Min Oh, Daejeon (KR)

(73) Assignees: Samsung Electronics Co., Ltd (KR);
Korea Advanced Institute of Science and Technology (KR)

( * ) Notice: Subject to any disclaimer, the term of this patent is extended or adjusted under 35 U.S.C. 154(b) by 1222 days.

(21) Appl. No.: 11/871,528

(22) Filed: Oct. 12, 2007

(65) Prior Publication Data

US 2008/0090580 A1 Apr. 17, 2008

(30) Foreign Application Priority Data

Oct. 13, 2006 (KR) .................. 10-2006-0099834

(51) Int. Cl.
*H04W 72/00* (2009.01)
(52) U.S. Cl. ........................ 455/450; 455/447
(58) Field of Classification Search .......... 455/450, 455/447
See application file for complete search history.

(56) References Cited

U.S. PATENT DOCUMENTS

| | | | |
|---|---|---|---|
| 6,560,459 B1 * | 5/2003 | Wong | 455/447 |
| 2006/0142015 A1 | 6/2006 | Boyer et al. | |
| 2006/0148408 A1 | 7/2006 | Cho et al. | |

FOREIGN PATENT DOCUMENTS

| | | |
|---|---|---|
| EP | 1 575 318 | 9/2005 |
| JP | 9-233536 | 9/1997 |
| JP | 2001-313977 | 11/2001 |
| JP | 2006-522503 | 9/2006 |
| KR | 1020070077579 | 7/2007 |
| WO | WO 02/49305 | 6/2002 |
| WO | WO 2005/018186 | 2/2005 |
| WO | WO 2006/070756 | 7/2006 |

* cited by examiner

*Primary Examiner* — Kamran Afshar
*Assistant Examiner* — Sayed T Zewari
(74) *Attorney, Agent, or Firm* — The Farrell Law Firm, P.C.

(57) ABSTRACT

An apparatus and method for allocations segments in a broadband wireless communication system is provided. Sector pairs are generated with respect to all sectors existing in different cells and the generated sector pairs are sorted according to priority based on a proximity. A sector pair having a top priority among unselected sector pairs is selected. Segments are allocated to all sectors of a cell including each sector of the selected sector pair. Accordingly, segments can be allocated to sectors while minimizing downlink throughput deterioration caused by segment duplication.

23 Claims, 5 Drawing Sheets

APPARATUS AND METHOD FOR ALLOCATING SEGMENTS IN BROADBAND WIRELESS COMMUNICATION SYSTEM

PRIORITY

This application claims priority under 35 U.S.C. §119(a) of a Korean patent application filed in the Korean Intellectual Property Office on Oct. 13, 2006 and assigned Serial No. 2006-0099834, the entire disclosure of which is hereby incorporated by reference.

BACKGROUND OF THE INVENTION

1. Field of the Invention

The present invention relates generally to segment allocation, and more particularly, to an apparatus and method for allocating segments to improve downlink throughput in a broadband wireless communication system.

2. Description of the Related Art

An Institute of Electrical and Electronics Engineers (IEEE) 802.16e system employs a cellular scheme and supports a frequency reuse factor of 1. As a result, neighboring cells can use the same frequency. Thus, a Mobile Station (MS) existing in such a system has to be able to distinguish a Base Station (BS) where the MS resides, from a neighboring BS among a plurality of BSs, which use the same frequency. For this purpose, whenever a frame is transmitted to the MS, each BS transmits the frame by inserting a Pseudo Noise (PN) code to a preamble, which is a first symbol of the frame.

According to an IEEE 802.16e standard, a total of 114 preamble PN codes are defined, and the codes have code indices 0 to 113, respectively. In addition, the preamble PN codes each have an Identification (ID) cell (hereinafter, referred to as IDcell) and a segment number. By analyzing the preamble PN codes, the MS can recognize a code index, an IDcell, and a segment number of a corresponding BS. The IDcell has 32 values (i.e., 0 to 31). The segment number has three values (i.e., 0 to 2). Not all codes have unique IDcell and segment number combinations. Thus, among the 114 codes, only the codes 0 to 95 have unique IDcell and segment number combinations. The IDcell and segment number combination of the codes 96 to 113 are duplicated with that of the codes 0 to 95.

A segment is used for various purposes, and a result of segment allocation has a significant effect on system performance. Importantly, the segment determines a carrier set through which a preamble is transmitted. The preamble is transmitted through only a ⅓ part of a sub-carrier, which remains after removing a guard band. The sub-carrier set may be determined by using Equation (1) below.

$$\text{carrier set} = \text{segment} + 3k \, (k=0,1,2,\ldots) \quad \text{Equation (1)}$$

Equation (1) shows that, when the same segment is allocated to neighboring sectors, preambles of two sectors are transmitted through the same carrier set. In this case, even if an MS can obtain a preamble without any problems because different code indices are allocated to the preambles of the two sectors, downlink throughput may deteriorate.

In a downlink channel, the MS estimates a pilot signal transmitted from a BS. The estimation result is used in a demodulation process. However, similar to a Frame Control Header (FCH) and a Downlink-MAP (DL-MAP), when information is transmitted during first few symbols of a frame, no pilot signal is transmitted from the BS, resulting in difficulty in channel estimation. Therefore, the MS estimates a channel by using the preamble. In this case, whether a carrier set is duplicated between neighboring sectors significantly affects capability of channel estimation. If different segments are allocated to neighboring sectors and thus preambles are transmitted through different carrier sets, then channel estimation can be accurately achieved through the preamble, which leads to improved modulation capability of the FCH and the DL-MAP. On the other hand, if the same segment is allocated to the neighboring sectors, channel estimation is inaccurately achieved through the preamble, which may result in deterioration in downlink demodulation capability.

Moreover, a segment may determine a frequency band used in a downlink Partial Usage of Sub-Carrier (PUSC) zone. In the downlink PUSC zone, a sub-carrier is divided into 6 groups, which include 3 major groups and 3 minor groups. Each sector may use all or some of the 6 groups, and information thereof is transmitted to the MS through the FCH. In this case, each sector must use one or more major groups, and a major group number to be used is determined by a segment allocated to the sector. In order to reduce interference between cells in a cell boundary area, the system may allow some groups to be used between sectors, and this will be referred to as segmented PUSC. If the neighboring sectors use the same segment, the two sectors use the same group. As a result, interference is not diminished even when the segmented PUSC is used, which leads to deterioration in downlink throughput.

As such, when the same segment is allocated to neighboring sectors, downlink modulation capability may deteriorate. Therefore, segment allocation may significantly affect system performance. However, since the number of segments is limited to three, it is not easy to allocate segments while minimizing segment duplication between the neighboring sectors.

SUMMARY OF THE INVENTION

The present invention has been made to address at least the above-mentioned problems and/or disadvantages and to provide at least the advantages described below. Accordingly, an aspect of the present invention is to provide an apparatus and method for allocating segments to improve downlink throughput in a broadband wireless communication system.

Another aspect of the present invention is to provide an apparatus and method for allocating segments according to an objective function and a proximity in a broadband wireless communication system.

An additional aspect of the present invention is to provide an apparatus and method in which segments are allocated in such a manner that different segments are allocated to sectors existing in the same cell while minimizing segment duplication between neighboring sectors each of which exist in different cells.

According to an aspect of the present invention, a method of allocating segments in a wireless communication system is provided. Sector pairs are generated with respect to all sectors existing in different cells and the generated sector pairs are sorted according to priority based on a proximity. A sector pair is selected having a top priority among unselected sector pairs. Segments are allocated to all sectors of a cell including each sector of the selected sector pair.

According to another aspect of the present invention, an apparatus for allocating segments in a wireless communication system is provided. The apparatus includes a sector pair generator/sorter for generating sector pairs with respect to all sectors existing in different cells and sorting the generated sector pairs according to priority based on a proximity. The apparatus also includes a sector pair allocation state reader for selecting a sector pair having a top priority among unselected sector pairs until segment allocation is complete for all sectors and the all sectors are included in one cover, for reading a segment allocation state for the selected sector pair, and, according to the read allocation state, for outputting the selected sector pair so that segments are allocated or reallocated to all sectors of a cell including each sector of the selected sector pair.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention are described in detail below with reference to the accompanying drawings. The same reference numbers are used throughout the drawings. Detailed descriptions of constructions or processes known in the art may be omitted to avoid obscuring the subject matter of the present invention.

An apparatus and method of the present invention will be described hereinafter for allocating segments to improve downlink throughput in a broadband wireless communication system.

It will be assumed hereinafter that a Base Station (BS) includes one or more sectors. To compute a cost for the case where the same segment is allocated to neighboring sectors, a proximity between the sectors has to be defined. An amount of interference of a sector i with a sector j is defined as a proximity of sector i to sector j and is referred to as Prox_ij. The Prox_ij may be determined in other manners. For example, when using a network planning tool, Prox_ij may be determined to be a total amount of interference of sector j with sector i. When using only information on a distance between the sectors, Prox_ij may be determined to be a path loss value between sector i and sector j. Although Prox_ij can be determined in various manners, it will be assumed hereinafter that Prox_ij is determined by using an apparatus and method to be described later with reference to FIG. 1 and FIG. 2 according to an embodiment of the present invention.

Figure 1:
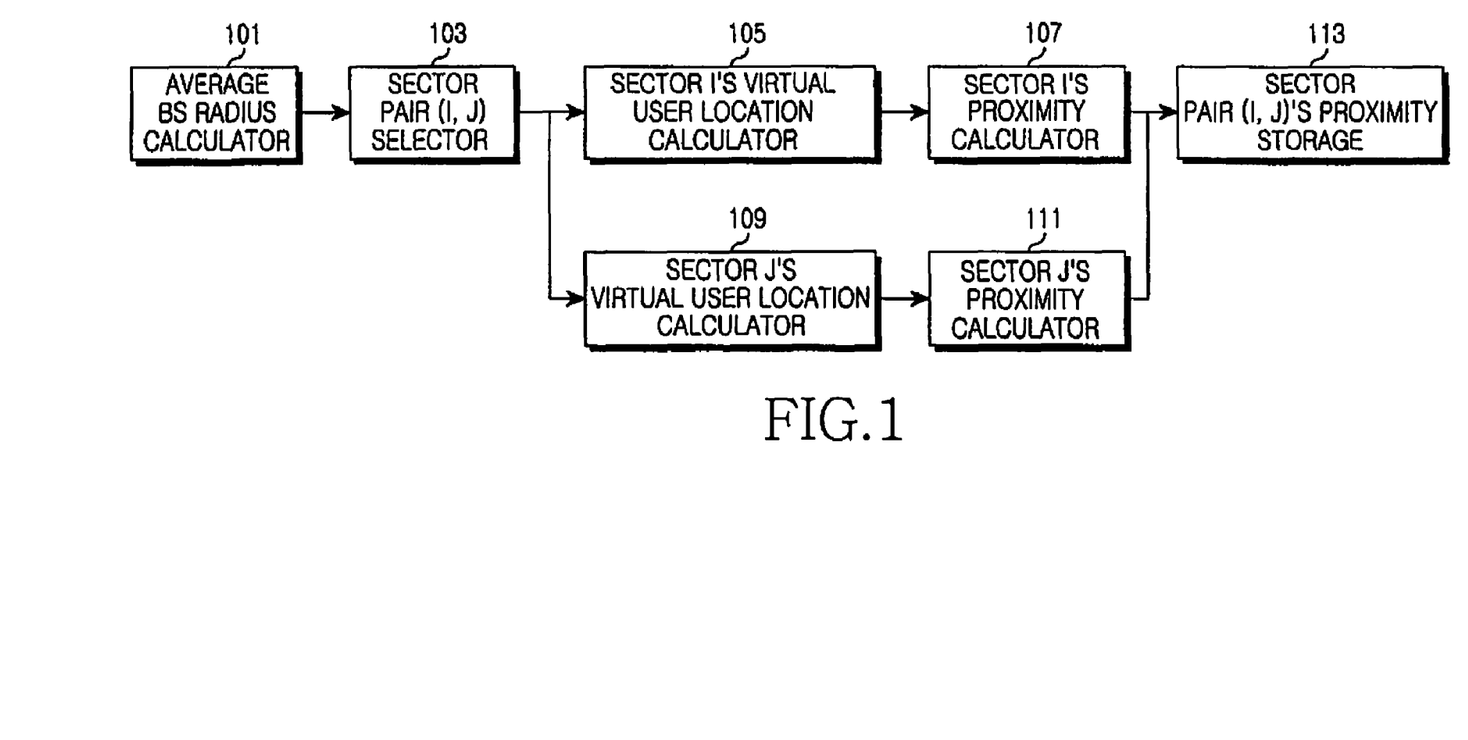
FIG. 1 is a block diagram illustrating a structure of an apparatus for determining a proximity between sectors in a broadband wireless communication system according to an embodiment of the present invention.

In a method of allocating segments according to an embodiment of the present invention, different segments are allocated to sectors existing in one cell. In addition, when segment allocation is performed on one sector existing in a cell, segments are allocated to all sectors existing in the cell. Further, segment allocation is also performed on sectors existing in another cell in accordance with a proximity between sectors. In this embodiment, the number of sectors existing in one cell is in the range of 1 to 3. However, when four or more sectors exist in one cell, a segment pattern may be defined for segment allocation. Herein, a cell is equivalent to a BS. Although segments are allocated in this embodiment, the present invention may also apply in allocation of a Pseudo-Random Bit Sequence ID (PRBS_IC), which is another parameter for identifying a BS in a broadband wireless communication system FIG. 1 is a block diagram illustrating a structure of an apparatus for determining a proximity between sectors in a broadband wireless communication system according to an embodiment of the present invention. The apparatus includes an average BS radius calculator 101, a sector pair (i, j) selector 103, a sector i's virtual user location calculator 105, a sector i's proximity calculator 107, a sector j's virtual user location calculator 109, a sector j's proximity calculator 111, a sector pair (i, j)'s proximity storage 113.

Referring to FIG. 1, the average BS radius calculator 101 calculates an average BS radius in the system and outputs the calculation result to the sector pair selector 103. Herein, a distance from an arbitrary BS i to its nearest BS is defined as di, an average of the distances di with respect to all BSs in the system is defined as an averages BS distance, and ½ of the average BS distance is defined as the average BS radius.

The sector pair (i, j) selector 103 selects an arbitrary sector pair (i, j), whose proximity is not determined, from a plurality of sector pairs. Then, the sector pair (i, j) selector 103 outputs the selected sector pair (i, j) and the average BS radius input from the average BS radius calculator 101 to the sector i's virtual user location calculator 105 and the sector j's virtual user location calculator 109.

By using the sector pair (i, j) input from the sector pair (i, j) selector 103 and the average BS radius, the sector i's virtual user location calculator 105 computes a location of a virtual user that represents sector i. Then, the sector i's virtual user location calculator 105 outputs the computation result to the sector i's proximity calculator 107. It is assumed herein that the virtual user is located at a position corresponding to ½ of the average BS radius along the same line of an antenna azimuth of sector i.

By using the computed location of the virtual user of sector i, the sector i's proximity calculator 107 computes a proximity Prox_ij of sector i to sector j and then outputs the computed proximity Prox_ij to the sector pair (i, j)'s proximity storage 113. The proximity Prox_ij is determined by using a path loss value between sector j and the virtual user of sector i. In this case, an antenna azimuth of sector i, an antenna pattern, and transmission power have to be taken into account.

By using the sector pair (i, j) input from the sector pair (i, j) selector 103 and the average BS radius, the sector j's virtual user location calculator 109 computes a location of a virtual user that represents sector j and then outputs the computation result to the sector j's proximity calculator 111. It is assumed herein that the virtual user is located at a position corresponding to ½ of the average BS radius along the same line of an antenna azimuth of sector j.

By using the computed location of the virtual user of sector j, the sector j's proximity calculator 111 computes a proximity Prox_ji of sector j to sector i and then outputs the computed proximity Prox_ij to the sector pair (i, j)'s proximity storage 113. The proximity Prox_ji is determined by using a path loss value between sector i and the virtual user of sector j. In this case, an antenna azimuth of sector j, an antenna pattern, and transmission power have to be taken into account.

The sector pair (i, j)'s proximity storage 113 determines a sum of the proximity Prox_ij and the proximity Prox_ji respectively input from the sector i's proximity calculator 107 and the sector j's proximity calculator 111 as a proximity of the sector pair (i, j) and then stores the determined proximity of the sector pair (i, j). The determined proximity of the sector pair (i, j) is used later in a segment allocation process.

Figure 2:
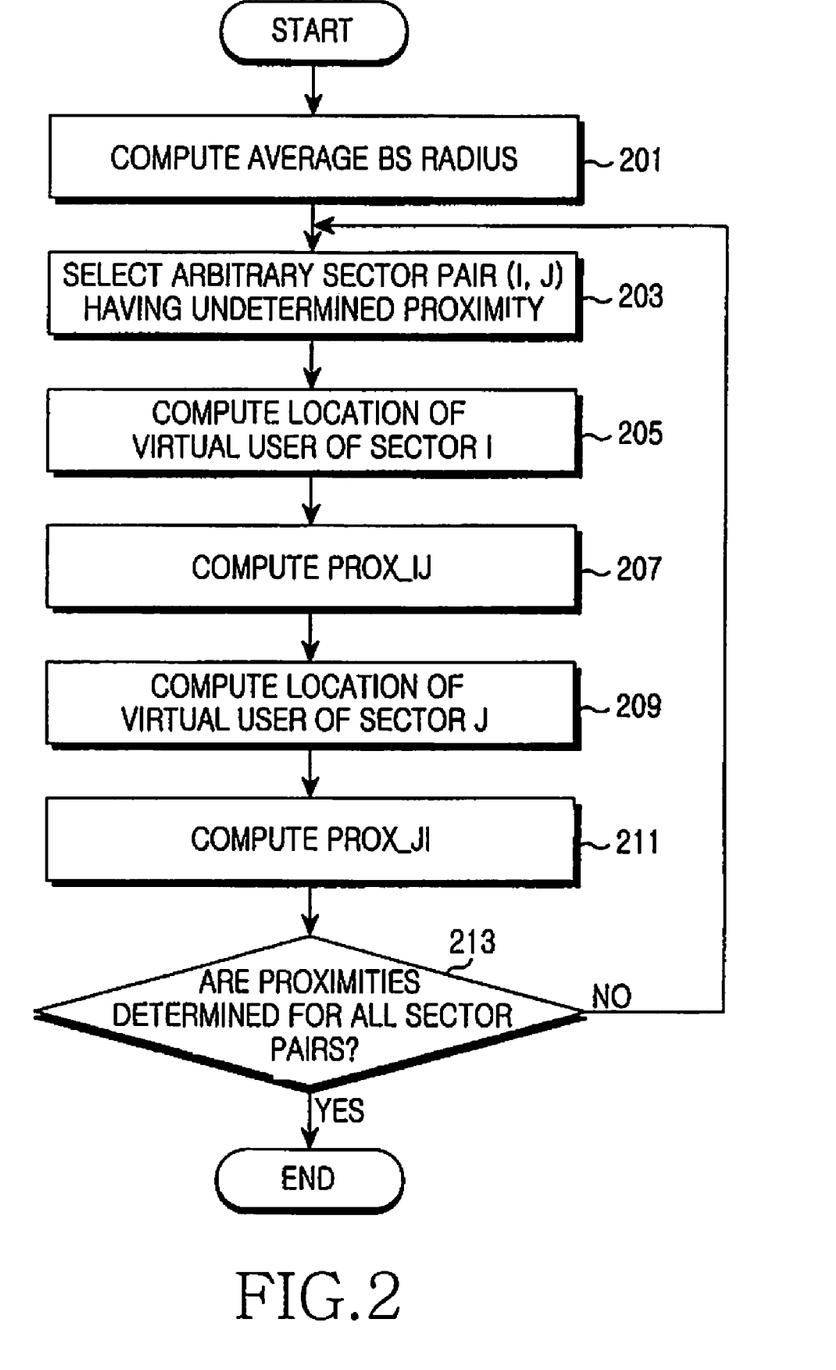
FIG. 2 is a flowchart illustrating a method of determining a proximity between sectors in a broadband wireless communication system according to an embodiment of the present invention.

FIG. 2 is a flowchart illustrating a method of determining a proximity between sectors in a broadband wireless communication system according to an embodiment of the present invention.

Referring to FIG. 2, in step 201, an average BS radius is computed. Herein, a distance from an arbitrary BS i to its nearest BS is defined as di, an average of the distances di with respect to all BSs in the system is defined as an average BS distance, and ½ of the average BS distance is defined as the average BS radius.

In step 203, an arbitrary sector pair (i, j) whose proximity is not determined is selected. In step 205, a location of a virtual user that represents sector i is computed. It is assumed herein that the virtual user is located at a position corresponding to ½ of the average BS radius along the same line of an antenna azimuth of sector i. In step 207, by using the computed location of the virtual user of sector i, a proximity Prox_ij of sector i to sector j is computed. The proximity Prox_ij is determined by using a path loss value between sector j and the virtual user of sector i. In this case, an antenna azimuth of sector i, an antenna pattern, and transmission power have to be taken into account.

Similar to the case of sector i, in step 209, a location of a virtual user of sector j is computed. In step 211, by using the computed location of the virtual user of sector j, a proximity Prox_ji of sector j to sector i is computed. That is, the proximity Prox_ji is determined by using a path loss value between sector i and the virtual user of sector j. In this case, an antenna azimuth of sector j, an antenna pattern, and transmission power have to be taken into account.

In step 213, it is checked whether proximities are determined for all sector pairs in the system. If the proximities are not determined for all sector pairs, the procedure returns to step 203. Otherwise, the procedure of FIG. 2 is terminated.

In situations in which proximities are determined for all sector pairs as described above, segments are allocated to the respective sectors. In this case, since interference of sector i with sector j may differ from interference of sector j with sector i, a proximity of the sector pair is determined to be a sum of the proximity Prox_ij and the proximity Prox_ji.

Figure 3:
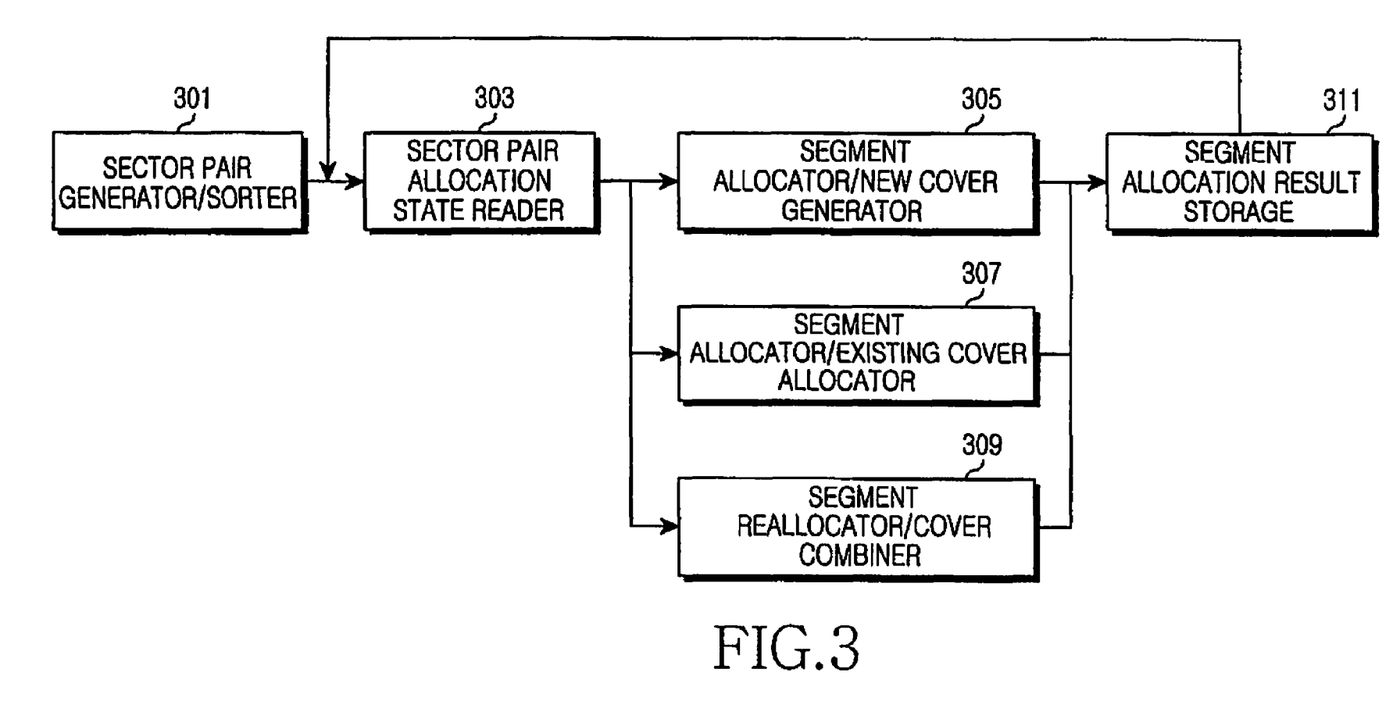
FIG. 3 is a block diagram illustrating an apparatus for allocating segments based on a proximity and an objective function in a broadband wireless communication system according to an embodiment of the present invention.

FIG. 3 is a block diagram illustrating an apparatus for allocating segments based on a proximity and an objective function in a broadband wireless communication system according to an embodiment of the present invention. The apparatus includes a sector pair generator/sorter 301, a sector pair allocation state reader 303, a segment allocator/new cover generator 305, a segment allocator/existing cover allocator 307, a segment reallocator/cover combiner 309, and a segment allocation result storage 311.

Referring to FIG. 3, the sector pair generator/sorter 301 generates pairs of all sectors, each of which exists in different cells, sorts the generated sector pairs according to a specific priority, and outputs the sorted sector pairs to the sector pair allocation state reader 303. For example, the sector pairs may be sorted in descending order based on a proximity.

The sector pair allocation state reader 303 selects a sector pair, which has a top priority among unselected sector pairs, from the sorted sector pairs input from the sector pair generator/sorter 301. Then, the sector pair allocation state reader 303 checks if both sectors of the selected sector pair are not allocated with segment, if both sectors are allocated with segments, or if only one of the both sectors is allocated with a segment. Segment allocation is performed for all sectors according to a segment allocation result input from the segment allocation result storage 311 and is repeated until all sectors are included in one cover. Thereafter, in the case where the both sectors of the selected sector pair are not allocated with segments, the sector pair allocation state reader 303 outputs the sector pair to the segment allocator/new cover generator 305. In the case where the both sectors are allocated with segments, the sector pair allocation state reader 303 outputs the sector pair to the segment reallocator/cover combiner 309. In the case where only one of the both sectors is allocated with a segment, the sector pair allocation state reader 303 outputs the sector pair to the segment allocator/existing cover allocator 307.

The segment allocator/new cover generator 305 selects a first sector from the sector pair input from the sector pair allocation state reader 303 and then allocates segments to sectors of a first cell including the first sector. In this case, segment allocation is performed so that an objective function value is minimized with respect to all existing cells. In the same manner, the segment allocator/new cover generator 305 allocates segments to sectors of a second cell including a second sector of the sector pair. Thereafter, the segment allocator/new cover generator 305 generates a new cover including the first and second cells and then outputs the segment allocation result to the segment allocation result storage 311.

The segment allocator/existing cover allocator 307 allocates segments to sectors of a cell including a sector to which no segment is allocated. Thereafter, the segment allocator/existing cover allocator 307 allows this cell to be included in an existing cover that includes another cell having a sector to which a segment is allocated. Thereafter, the segment allocator/existing cover allocator 307 outputs a segment allocation result to the segment allocation result storage 311. Segment allocation is performed in the same manner as described above.

The segment reallocator/cover combiner 309 checks whether cells including the two sectors of the sector pair input from the sector pair allocation state reader 303 are included in the same cover. If the two sectors are not included in the same cover, segment allocation is not modified for cells included in a larger cover. Regarding cells included in a smaller cover, segments are reallocated such that the objective function value is minimized by changing only a segment value while maintaining an allocation pattern used in segment allocation previously performed. Thereafter, the segment reallocator/cover combiner 309 combines the two covers by allowing the smaller cover (i.e., the cover having a smaller number of sectors) to be included in the larger cover. Then, the segment reallocator/cover combiner 309 outputs the segment allocation result to the segment allocation result storage 311.

The segment allocation result storage 311 stores the segment allocation result input from the segment allocator/new cover generator 305, the segment allocator/existing cover allocator 307, and the segment reallocator/cover combiner 309 and then outputs the stored segment allocation result to the sector pair allocation state reader 303.

Figure 4:
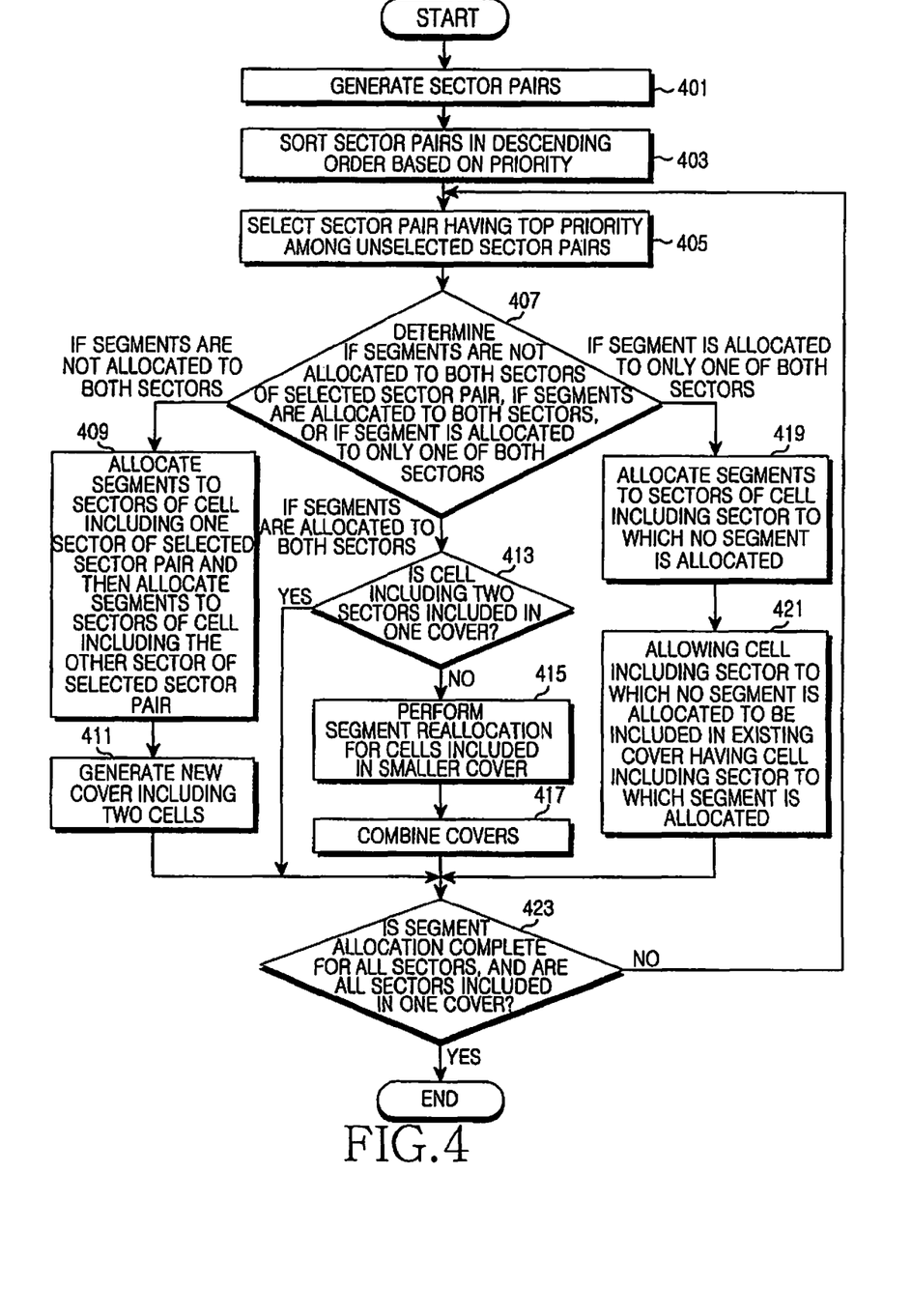
FIG. 4 is a flowchart illustrating a method of allocating segments based on a proximity and an objective function in a broadband wireless communication system according to an embodiment of the present invention.

FIG. 4 is a flowchart illustrating a method of allocating segments based on a proximity and an objective function in a broadband wireless communication system according to an embodiment of the present invention.

Referring to FIG. 4, in step 401, pairs of all sectors, each of which exists in different cells, are generated. In step 403, the generated sector pairs are sorted according to a specific priority. For example, the sector pairs may be sorted in descending order based on a proximity.

In step 405, a sector pair having a top priority among unselected sector pairs is selected. In step 407, it is checked if both sectors of the selected sector pair are not allocated with segments, if both sectors are allocated with segments, or if only one of the sectors is allocated with a segment.

If the result of step 407 shows that the both sectors of the selected sector pair are not allocated with segments, in step 409, a first sector is selected from the selected sector pair, and segments are allocated to sectors of a first cell including the first sector. In this case, segment allocation is performed so that an objective function value is minimized with respect to all existing cells. In the method of allocating segments among predetermined segment allocation patterns, a segment pattern is selected so that the objective function value is minimized. For example, if a cell includes three sectors α, β, and γ, and a segment pattern (a, b, c) is allocated to the sectors α, β, and γ, then the segment pattern (a, b, c) is determined to be a pattern that minimizes an objective function value, selected from a group consisting of six patterns (0, 1, 2), (0, 2, 1), (1, 0, 2), (1, 2, 0), (2, 0, 1), and (2, 1, 0). Alternatively, segments may be allocated randomly or according to a specific rule. In step 409, regarding sectors of a second cell including a second sector of the selected sector pair, segments are allocated in the same manner as described above.

An objective function for the segment allocation is determined by Equation (2) below.

$$\min\left[\sum_i (\text{prox\_iw}_i + \text{prox\_w}_i i)\right] \quad (2)$$

Herein, $w_i$ denotes a sector having the greatest sector pair proximity among sectors, each having the same segment as the sector i. Since there are only three segments, segment duplication frequently occurs in the system. Thus, if the objective function is determined in accordance with only a worst case, overall system performance may significantly decrease in order to improve capability of one sector pair in the worst case. On the other hand, if all sector pairs having the same segment are taken into account, capability of a specific sector may significantly decrease in order to improve overall system performance. Therefore, in the present embodiment, the objective function is determined such that sector pairs are generated in accordance with only one sector which is affected the most by segment duplication and a sum of proximities of such sector pairs is minimized with respect to all sectors.

In step 411, a new cover is generated so as to include two cells to which segments are allocated. In step 423, it is checked whether segment allocation is complete for all sectors, and whether all sectors are included in one cover. If segment allocation is not complete for all sectors, or if all sectors are not included in one cover, the procedure returns to step 405, and subsequent steps are repeated. Otherwise, the procedure of FIG. 4 is terminated.

If the result of step 407 shows that segments are allocated to both sectors of the selected sector pair, in step 413, it is checked whether cells including the two sectors of the selected sector pair are included in one cover. If the cells including the two sectors are included in the same cover, the procedure continues at step 423. On the other hand, if the two sectors are not included in the same cover, in step 415, segment allocation is not modified for cells included in a larger cover. Regarding cells included in a smaller cover, segment reallocation is performed by selecting a predetermined segment pattern for reallocation according to a result of segment allocation previously performed. In other words, segments are reallocated such that the objective function value is minimized by changing only a segment value, while maintaining an allocation pattern used in segment allocation previously performed. For example, if a set of sectors to which a segment 0 is previously allocated is defined as A, a set of sectors to which a segment 1 is allocated is defined as B, and a set of sectors to which a segment 2 is allocated is defined as C, then a segment reallocation pattern (A, B, C) may include six patterns (0, 1, 2), (0, 2, 1), (1, 0, 2), (1, 2, 0), (2, 0, 1), and (2, 1, 0), and among them, a pattern that minimizes the objective function value is selected to reallocate segments. In step 417, the two covers are combined by allowing the smaller cover (i.e., the cover having a smaller number of sectors) to be included in the larger cover. Then, the procedure continues at step 423.

If the result of step 407 shows that a segment is allocated to only one of the both sectors of the selected sector pair, in step 419, segments are allocated to sectors of a first cell including a first sector to which no segment is allocated in the selected sector pair. Thereafter, in step 421, the first cell is included in an existing cover that has a second cell including a second sector to which a segment is allocated in the selected sector pair. Segment allocation is performed in the same manner as the aforementioned method of allocating segments.

FIGS. 5A to 5D illustrate examples of a method of allocating segments based on a proximity and an objective function in a broadband wireless communication system according to an embodiment of the present invention.

Referring to FIGS. 5A to 5D, proximities among sectors included in different cells are computed, and the computed proximities are sorted in descending order. Thereafter, in a first iteration of segment allocation, as indicated by two solid-line circles in FIG. 5A, a sector pair is selected in which both sectors are not included in the same cell and have the highest proximity. In this case, the selected sector pair is in a state where segment allocation has not yet been performed on each sector of the selected sector pair. Thus, segments are arbitrarily allocated for a first cell, and then, segment allocation is performed on a second cell. Thereafter, the two cells are included in a cover 501.

Figure 5A:
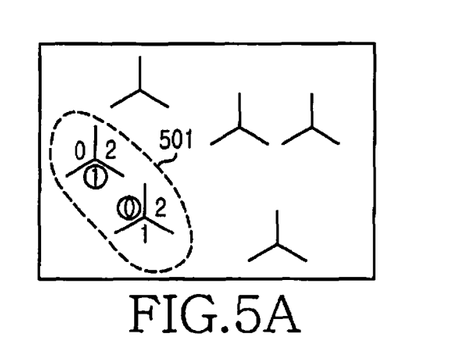
FIGS. 5A to 5D illustrate examples of a method of allocating segments based on a proximity and an objective function in a broadband wireless communication system according to an embodiment of the present invention.
Figure 5B:
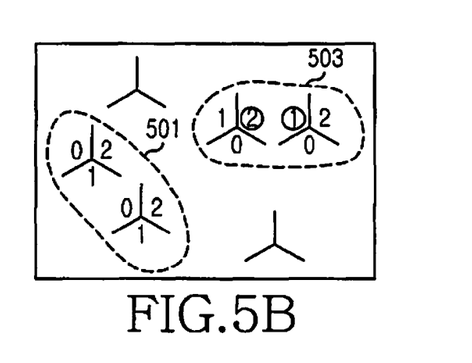

In a second iteration of segment allocation, as indicated by two solid-line circles in FIG. 5B, a sector pair is selected in which both sectors are not included in the same cell and have the second highest proximity. In this case, similar to the first iteration, the selected sector pair is in a state where segment allocation has not yet been performed on each sector of the selected sector pair. Thus, segments are arbitrarily allocated to a first cell, and then, segment allocation is performed on a second cell. Thereafter, the two cells are included in a cover 503.

Figure 5C:
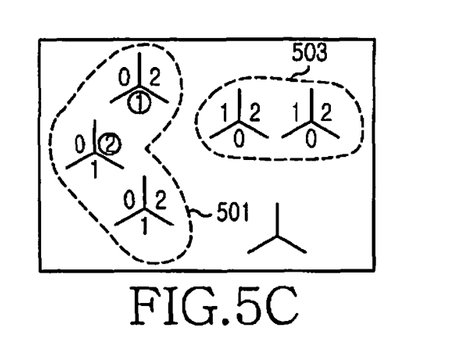

In a third iteration of segment allocation, as indicated by two solid-line circles in FIG. 5C, a sector pair is selected in which both sectors are not included in the same cell and have the third highest proximity. In this case, the selected sector pair is in a state where a first sector thereof is allocated with a segment and a second sector thereof is allocated with no segment, and then, segment allocation is performed on a cell including the second sector. Thereafter, a cell including the second sector is included in the cover 501 including the first sector.

Figure 5D:
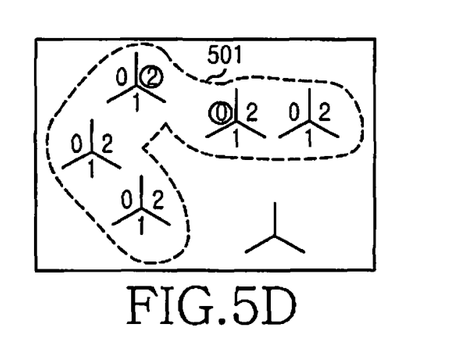

In a fourth iteration of segment allocation, as indicated by two solid-line circles in FIG. 5D, a sector pair is selected in which both sectors are not included in the same cell and have the fourth highest proximity. In this case, the selected sector pair is in a state where both sectors thereof are allocated with segments and are included in different covers in the previous iteration. Thus, sizes of the covers including the sectors are compared with each other so that the smaller cover 503 is combined with the larger cover 501. In the previous iteration, the left cover 501 contains more cells than the right cover 503. Thus, segment reallocation is performed on a cell included in the right cover 503.

According to the present invention, an apparatus and method for allocating segments is provided in which, based on an objective function and a proximity in a broadband wireless communication system, different segments are allocated to sectors existing in the same cell while minimizing duplication of segments allocated to adjacent sectors existing in different cells. Therefore, there is an advantage in that segments can be allocated to sectors while minimizing downlink throughput deterioration caused by segment duplication.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A method of allocating segments in a wireless communication system, the method comprising the steps of:
generating sector pairs with respect to all sectors existing in different cells and sorting the generated sector pairs according to priority based on a proximity;
selecting a sector pair having a top priority among unselected sector pairs; and
allocating segments to all sectors of a cell including each sector of the selected sector pair wherein the allocating of segments further comprises:
if segments are not allocated to a first sector and a second sector of the selected sector pair, allocating segments to sectors of a first cell including the first sector, allocating segments to sectors of a second cell including the second sector, and generating a cover having the first and second cells;
if a segment is allocated only to the first sector of the selected sector pair, allocating segments to sectors of the second cell including the second sector and allowing the second cell to be included in a cover having the first cell including the first segment; and if segments are allocated to the first and second sectors, when the first and second cells are included in different covers, performing segment reallocation on sectors of a cell included in a smaller cover and combining the different covers.

2. The method of claim 1, wherein segment allocation is performed to satisfy an objective function of $$\min\left[\sum_i (\text{prox\_iw}_i + \text{prox\_w}_i i)\right],$$

where $w_i$ denotes a sector having the greatest sector pair proximity among sectors each having the same segment as a sector i, and prox_ab denotes a proximity of a sector a to a sector b, and
wherein the objective function is performed so that a sector pair is generated in accordance with a sector affected the most by segment duplication while minimizing a sum of proximities of all sectors with respect to the generated sector pair.

3. The method of claim 2, wherein segment allocation is performed in accordance with all existing cells, and a segment allocation pattern that minimizes a value of the objective function is used among predetermined segment allocation patterns.

4. The method of claim 3, wherein, when each cell includes three sectors, segments are allocated to the three sectors using a segment pattern selected from a group consisting of (0, 1, 2), (0, 2, 1), (1, 0, 2), (1, 2, 0), (2, 0, 1), and (2, 1, 0).

5. The method of claim 2, wherein segment reallocation is performed such that a value of the objective function is minimized by modifying only a segment value while maintaining an allocation pattern without alteration from previous segment allocation.

6. The method of claim 5, wherein the segment value is modified to a segment reallocation pattern that minimizes the objective function value among predetermined segment reallocation patterns, and
wherein, if a set of sectors to which a segment 0 is previously allocated is defined as A, a set of sectors to which a segment 1 is allocated is defined as B, and a set of sectors to which a segment 2 is allocated is defined as C, then a segment reallocation pattern (A, B, C) is selected from a group consisting of (0, 1, 2), (0, 2, 1), (1, 0, 2), (1, 2, 0), (2, 0, 1), and (2, 1, 0).

7. The method of claim 1, wherein the selecting of a sector pair having a top priority among unselected sector pairs is repeated until segment allocation is complete for all sectors and all sectors are included in one cover.

8. The method of claim 1, further comprising, after the generating of sector pairs and before sorting the generated sector pairs:
selecting an arbitrary sector pair (i, j) whose proximity is undetermined;
computing a location of a virtual user of the sector i and computing a proximity of the sector i to the sector j by using the computed location of the virtual user of the sector i;
computing a location of a virtual user of the sector j and computing a proximity of the sector j to the sector i by using the computed location of the virtual user of the sector j; and
determining a proximity of the arbitrary sector pair (i,j) to be a sum of the proximity of the sector i to the sector j and the proximity of the sector j to the sector i.

9. The method of claim 8, wherein the virtual user of each sector is located at a position corresponding to ½ of an average Base Station (BS) radius in a system along a same line of an antenna azimuth of a corresponding sector.

10. The method of claim 9, wherein the average BS radius is ½ of an average BS distance that is an average distance from an arbitrary BS to its nearest BS with respect to all BSs existing in the system.

11. The method of claim 8, wherein the proximity of each sector is computed using a path loss value between one sector of the selected sector pair and a virtual user of the other sector of the selected sector pair.

12. The method of claim 8, wherein the proximity of each sector is computed in accordance with at least one selected from a group consisting of an antenna azimuth of a corresponding sector, an antenna pattern, and transmission power.

13. An apparatus for allocating segments in a wireless communication system, the apparatus comprises:
  a sector pair generator/sorter for generating sector pairs with respect to all sectors existing in different cells and sorting the generated sector pairs according to priority based on a proximity; and
  a sector pair allocation state reader for selecting a sector pair having a top priority among unselected sector pairs until segment allocation is complete for all sectors and all sectors are included in one cover, for reading a segment allocation state for the selected sector pair, and, according to the read allocation state, for outputting the selected sector pair so that segments are allocated to all sectors of a cell including each sector of the selected sector pair
  a segment allocator/new cover generator for receiving the sector pair in which no segment is allocated to first and second sectors, for allocating segments to sectors of a first cell including the first sector, allocating segments to sectors of a second cell including the second sector, and thereafter for generating a cover including the first and second cells;
  a segment reallocator/cover combiner for receiving the sector pair for allocating segments to the first and second sectors, and when the first and second cells are included in different covers, for performing segment reallocation on one of the cells included in a smaller cover and combining the two covers; and
  a segment allocator/existing cover allocator for receiving the sector pair in which a segment is allocated to only to the first sector and for allocating segments to sectors of the second cell including the second sector and allowing the second cell to be included in a cover having the first cell including the first cell.

14. The apparatus of claim 13, wherein segment allocation is performed to satisfy an objective function of $$\min\left[\sum_i (\text{prox\_iw}_i + \text{prox\_w}_i i)\right],$$

where $w_i$ denotes a sector having the greatest sector pair proximity among sectors each having the same segment as a sector i, and prox_ab denotes a proximity of a sector a to a sector b, and
  wherein the objective function is performed so that a sector pair is generated in accordance with only one sector that is affected the most by segment duplication while minimizing a sum of proximities of all sectors with respect to the generated sector pair.

15. The apparatus of claim 14, wherein segment allocation is performed in accordance with all existing cells, and a segment allocation pattern that minimizes the objective function value is used among predetermined segment allocation patterns.

16. The apparatus of claim 15, wherein, when each cell includes three sectors, segments are allocated to the three sectors using a segment pattern selected from a group consisting of (0, 1, 2), (0, 2, 1), (1, 0, 2), (1, 2, 0), (2, 0, 1), and (2, 1, 0).

17. The apparatus of claim 14, wherein segment reallocation is performed such that a value of the objective function is minimized by modifying only a segment value while maintaining an allocation pattern without alteration from previous segment allocation.

18. The apparatus of claim 17, wherein the segment value is modified to a segment reallocation pattern that minimizes the objective function value among predetermined segment reallocation patterns, and
  wherein, if a set of sectors to which a segment 0 is previously allocated is defined as A, a set of sectors to which a segment 1 is allocated is defined as B, and a set of sectors to which a segment 2 is allocated is defined as C, then a segment reallocation pattern (A, B, C) is selected from a group consisting of (0, 1, 2), (0, 2, 1), (1, 0, 2), (1, 2, 0), (2, 0, 1), and (2, 1, 0).

19. The apparatus of claim 13, further comprising:
  a sector pair (i, j) selector for selecting an arbitrary sector pair (i, j) having an undetermined proximity among the generated sector pairs;
  a sector i's virtual user location calculator for computing a location of a virtual user of the sector i;
  a sector i's proximity calculator for computing a proximity of the sector i to the sector j by using the computed location of the virtual user of the sector i;
  a sector j's virtual user location calculator for computing a location of a virtual user of the sector j;
  a sector j's proximity calculator for computing a proximity of the sector j to the sector by using the computed location of the virtual user of the sector j;
  a sector pair (i, j)'s proximity storage for determining a proximity of the sector pair to be a sum of the proximity of the sector i to the sector j and the proximity of the sector j to the sector i.

20. The apparatus of claim 19, wherein the virtual user of each sector is located at a position corresponding to ½ of an average Base Station (BS) radius in a system along the same line of an antenna azimuth of a corresponding sector.

21. The apparatus of claim 20, wherein the average BS radius is ½ of an average BS distance that is an average distance from an arbitrary BS to its nearest BS with respect to all BSs existing in the system.

22. The apparatus of claim 19, wherein the proximity of each sector is computed using a path loss value between one sector of the selected sector pair and a virtual user of the other sector of the selected sector pair.

23. The apparatus of claim 19, wherein the proximity of each sector is computed in accordance with at least one selected from a group consisting of an antenna azimuth of a corresponding sector, an antenna pattern, and transmission power.

* * * * *